D. Bowman,

Millstone Dress.

No. 104,107.   Patented Jun. 14, 1870.

Witnesses:   Inventor
Victor Hagmann   D. Bowman
C. A. Pettit   per Munn & Co
   Attorneys

UNITED STATES PATENT OFFICE.

DANIEL BOWMAN, OF JOHNSON CITY, TENNESSEE.

IMPROVEMENT IN MILLSTONE-DRESS.

Specification forming part of Letters Patent No. 104,107, dated June 14, 1870.

*To all whom it may concern:*

Be it known that I, DANIEL BOWMAN, of Johnson City, in the county of Washington and State of Tennessee, have invented a new and Improved Millstone-Dress; and I do hereby declare that the following is a full, clear, and exact description of the same, reference being had to the accompanying drawing, forming a part of this specification, in which—

Figure 1:
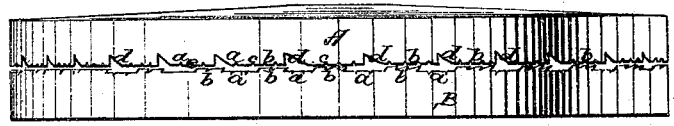
Figure 2:
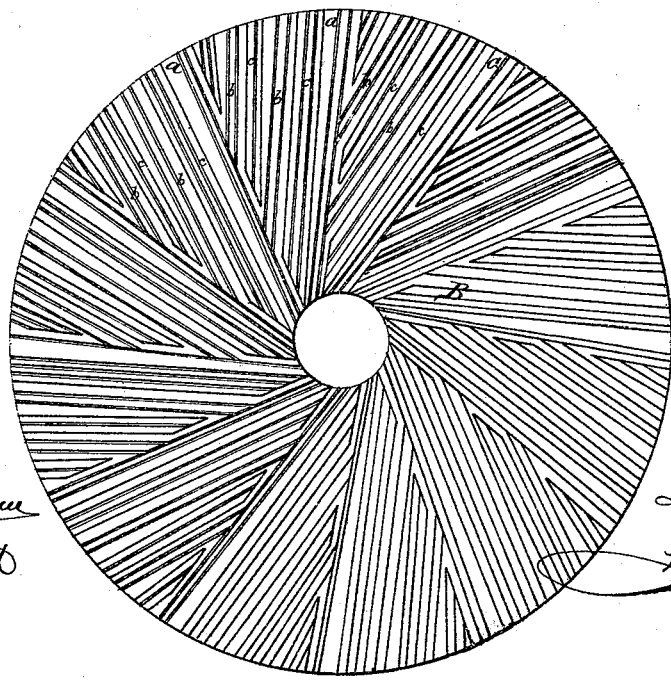

Figure 1 is a side elevation of both stones, and Fig. 2 is a plan view of the under side of the upper stone.

This invention is an improvement on that for which Letters Patent No. 63,360, dated April 2, 1867, antedated March 28, 1867, were granted me.

The improvement lies simply in channeling the furrows of the stones lengthwise of the same, making in the bed-stone one or more parallel shallow channels in each furrow, and in the runner one or more similar parallel shallow channels in each furrow, together with one wider and deeper channel at the side of each furrow, the function of the shallow channels being to produce flour of fine round or granular particles, without bruising or mashing them, and the function of the deeper channels being to ventilate the stone.

In the drawing, A is the upper stone; $a\ a$, &c., its furrows; and $b\ b$, &c., its lands. In the furrows $c\ c$, &c., are the shallow channels, and $d$ the deeper or ventilating channels.

All the channels are cut with one side vertical, or nearly so, and the other side inclined, and either straight or convex. I consider the convex form preferable.

The ventilating-channels $d$ gradually decrease in width and depth from their outer ends at the circumference to their inner ends at the eye, or at the sides of the longer furrows.

In the lower stone B the channels are all of the same depth and width, and very shallow, and subserve simply a grinding function, the channels $d$ in the upper stone being sufficient for purposes of ventilation.

The channels $c$ produce flour of a lively quality, and by reason of the increase in the number of comminuting-surfaces which they bring, they accomplish their object without grinding the flour too much, and thus killing the life of it, while the deep channels keep the stones cool. The furrows and channels may be either curved or straight.

Having thus described my invention, what I claim as new, and desire to secure by Letters Patent, is—

A millstone provided with furrows $a$, when these furrows are themselves channeled, as shown at $c\ d$, substantially in the manner and for the purpose described.

DANIEL BOWMAN.

Witnesses:
CHAS. A. PETTIT,
SOLON C. KEMON.